(12) United States Patent
Cornaglia et al.

(10) Patent No.: US 10,358,962 B2
(45) Date of Patent: Jul. 23, 2019

(54) UNIT FOR FEEDING A REDUCING SOLUTION FROM THE TANK TO THE EXHAUST DUCT OF AN ENGINE

(71) Applicant: OFFICINE METALLURGICHE G. CORNAGLIA S.P.A., Beinasco (IT)

(72) Inventors: Umberto Cornaglia, Moncalieri (IT); Giorgio Rocca, Turin (IT); Giorgio Villata, Chieri (IT)

(73) Assignee: Officine Metallurgiche G. Cornaglia, S.p.A., Beinasco (TO) (IT)

( * ) Notice: Subject to any disclaimer, the term of this patent is extended or adjusted under 35 U.S.C. 154(b) by 67 days.

(21) Appl. No.: 15/500,255

(22) PCT Filed: Aug. 3, 2015

(86) PCT No.: PCT/IB2015/055893
§ 371 (c)(1),
(2) Date: Jan. 30, 2017

(87) PCT Pub. No.: WO2016/020833
PCT Pub. Date: Feb. 11, 2016

(65) Prior Publication Data
US 2017/0248053 A1    Aug. 31, 2017

(30) Foreign Application Priority Data
Aug. 4, 2014    (IT) .............. TO2014A0626

(51) Int. Cl.
*F01N 3/20*    (2006.01)
*F28D 1/047*    (2006.01)
(Continued)

(52) U.S. Cl.
CPC ............ *F01N 3/2066* (2013.01); *B60K 13/04* (2013.01); *F28D 1/0213* (2013.01);
(Continued)

(58) Field of Classification Search
CPC ............... F01N 3/2066; F01N 2610/02; F01N 2610/10; F01N 2610/1406;
(Continued)

(56) References Cited

U.S. PATENT DOCUMENTS 7,647,767 B2 * 1/2010 Osaku ................... F01N 3/2066
60/286
2011/0271754 A1   11/2011 Ross, Jr. et al.
2013/0112371 A1   5/2013 Koo et al.

FOREIGN PATENT DOCUMENTS

EP         0803696 A2    10/1997
JP      2000-337786 A    12/2000
(Continued)

*Primary Examiner* — Laert Dounis
*Assistant Examiner* — Kelsey L Stanek
(74) *Attorney, Agent, or Firm* — Howson & Howson LLP (57) ABSTRACT

Unit (11) for feeding a reducing solution from the tank to the exhaust duct of an endothermic engine is provided. The unit comprises a supporting head (13) arranged for being associated to an aperture provided in a reducing solution tank and a heating device (15) for heating the reducing solution contained in the tank. The heating device (15) extends from the supporting head (13) and is provided with a duct (17) for a heating fluid. The duct (17) is defined by a side wall (31) which, when the unit (11) is in use, is internally in contact with the heating fluid passing through the duct (17) and externally in contact with the reducing solution present in the tank. At least one portion of the wall (31) of the duct (17) is non-smooth inside and/or outside the duct.

17 Claims, 6 Drawing Sheets

(51) Int. Cl.
F28F 1/42 (2006.01)
F28D 7/02 (2006.01)
F28F 1/08 (2006.01)
F28D 1/02 (2006.01)
F28F 9/02 (2006.01)
B60K 13/04 (2006.01)
F28D 21/00 (2006.01)
B60K 15/01 (2006.01)
B60K 15/03 (2006.01)

(52) U.S. Cl.
CPC .......... *F28D 1/0472* (2013.01); *F28D 7/024* (2013.01); *F28F 1/08* (2013.01); *F28F 1/426* (2013.01); *F28F 9/0258* (2013.01); *B60K 15/01* (2013.01); *B60K 2015/03427* (2013.01); *F01N 2610/02* (2013.01); *F01N 2610/10* (2013.01); *F01N 2610/1406* (2013.01); *F01N 2900/1814* (2013.01); *F28D 2021/008* (2013.01); *F28D 2021/0022* (2013.01); *Y02A 50/2325* (2018.01); *Y02T 10/24* (2013.01)

(58) Field of Classification Search
CPC . F01N 2900/1814; B60K 13/04; B60K 15/01; B60K 2015/03427; F28D 1/0213; F28D 1/0472; F28D 7/024; F28D 2021/0022; F28D 2021/008; F28F 1/08; F28F 1/426; F28F 9/0258; Y02T 10/24
USPC .......................................................... 60/301
See application file for complete search history.

(56) References Cited

FOREIGN PATENT DOCUMENTS

JP      2005-321156 A      11/2005
JP      2005321156 A  *   11/2005  ............ F28D 7/024

* cited by examiner

UNIT FOR FEEDING A REDUCING SOLUTION FROM THE TANK TO THE EXHAUST DUCT OF AN ENGINE

TECHNICAL FIELD

The invention relates to a unit for feeding a reducing solution from the tank to the exhaust of an engine.

PRIOR ART

In order to bring noxious gas emissions of internal combustion engines to the values imposed by recent regulations, it is necessary to adopt sophisticated systems for processing exhaust gases. One of such systems is known as "Selective Catalytic Reduction" (SCR). SCR provides for injecting, by means of a feeding unit, a liquid reducing agent into the exhaust gases. The reducing solution used nowadays is a solution of urea in deionised water. This solution is currently known as "Diesel Exhaust Fluid" (DEF) and provides for an urea concentration of about 30%. The reducing solution stocked in a dedicated tank is pressurized and injected, in an appropriate amount, into the engine exhaust gases, upstream of a catalyst SCR. Feeding of the reducing solution from the dedicated tank to the engine exhaust is effected by means of a feeding unit known in the field as "sender".

The feeding unit is associated to the dedicated tank and groups together a series of devices having the purpose of monitoring the status of the reducing solution and pressurizing it in order to allow injection thereof into the gas flow upstream of the catalyst SCR. The main functions performed by the feeding unit usually are: monitoring the filling level of the dedicated tank, measuring the temperature of the reducing solution, measuring the quantity of reducing solution, measuring the injection pressure, pressurizing the reducing solution, thawing the reducing solution. The feeding unit is therefore equipped with a set of sensors and devices. The unity further comprises a pump, for instance a displacement-type pump, for sucking the reducing solution from the tank and feeding it into the exhaust gases.

As is known, the reducing solution currently used freezes at approximately −11° C. Notwithstanding possible freezing, the reducing solution does not lose its characteristics and can be rapidly thawed for being fed to the SCR system. In order to thaw the reducing solution and to prevent it from freezing when the dedicated tank is at low temperatures, the fluid circulating in the cooling circuit of the engine is circulated in a duct submerged in the reducing solution tank. The "sender" feeding unit is therefore equipped with a heating device comprising a duct intended to be submerged in the reducing solution stocked in the dedicated tank. The heating device is hydraulically connected to the cooling circuit of the I.C. engine by means of special connectors provided on the "sender" feeding unit and accessible from the outside of the dedicated tank. The duct of the heating device is usually configured so as to define an at least partially spiral-like path between the inlet and outlet connectors that are provided on the head of the feeding unit. In some cases there are also provided electrical heaters for thawing the reducing solution in a quicker manner.

When the reducing solution is freezed, for instance upon cold-starting of a vehicle in the winter season, said solution cannot be fed to the exhaust gas duct of the I.C. engine. The efficiency of the exhaust gas processing system is therefore penalized until the reducing solution is thawed and feeding can take place. One of the problems to be solved in devising and making "sender" feeding units is therefore that of how to reduce the thawing time of the reducing solution. Current units provide for heating devices having a heating liquid duct which has a spiral-like shape and is submerged in the reducing solution. Current heating devices employ ducts that are smooth both inside and outside, typically made of stainless steel.

JP 2005321156A describes a heat exchanger made as a waveform spiral tube which is spirally wound and housed in a casing in which a substance in liquid state circulates. This device is capable of transferring heat quantities from a first liquid that flows in the tube to a second liquid that circulates in the casing and vice versa. The device, however, is not suitable for causing rapid change of state of the substance contained in the casing from the solid state, caused for instance by freezing, to the liquid state. The ridges and valleys of the tube are made in form of a continuous spiral so that the tube can be easily bent and wound manually. This feature makes the device little suitable for withstanding vibrations induced on the tube, for instance because the device is installed on a moving vehicle. Under such circumstances, the tube tends to become fractured, thus causing leakage of the liquid contained therein. This device is devised for static environments and is therefore unsuitable for use in movement conditions, for instance on a vehicle, in which the casing and the tube contained therein are subjected to continuous vibrations.

A first object of the invention is to provide a "sender" feeding unit equipped with a feeding unit more efficient than those of the prior art. Another object of the invention is to provide a "sender" feeding unit that allows thawing of the reducing solution in a quick time. A not least object of the invention is to provide a feeding unit that can be used in environments subjected to vibrations, typically a moving vehicle. A further object of the invention is to provide a unit of the aforesaid kind that can be industrially manufactured in a cost-convenient way and is robust and reliable.

The objects set forth above and other objects are achieved with the unit for feeding the reducing solution to the exhaust of the engine as claimed in the appended claims.

SUMMARY OF THE INVENTION

The feeding unit according to the invention is adapted to feed the reducing solution, contained in a dedicated tank, to the exhaust gas duct of an endothermic engine. The unit comprises a supporting head arranged for being associated to an aperture provided in the tank containing the reducing solution. In addition, the unit comprises a heating device for heating the reducing solution contained in the tank. The heating device extends inside the tank from the supporting head of the unit and is provided with a duct for a heating fluid, said duct being defined by a side wall. When the duct is submerged in the reducing solution and the heating fluid flows therethrough, the duct wall is in contact, on one part, i.e. inside the duct, with the heating fluid and on the other part, i.e. outside the duct, with the reducing solution. According to the invention, the duct wall of the heating device comprises at least one non-smooth portion. Advantageously, the non-smooth configuration of the wall inside the duct causes a turbulent motion in the heating fluid passing through the duct. In addition, the non-smooth configuration of the wall inside and outside the duct increases the heat exchange surface with respect to both the fluid flowing through the duct and the reducing solution surrounding it. The surface available for heat exchange which is obtained according to the invention is advantageously larger than that of a duct having a smooth wall. Indeed, as is known, the heat exchange capacity is directly proportional to the extension of the surface of the duct wall.

The non-smooth configuration of the inner surface of the duct wall further causes turbulent motions in the fluid circulating inside the duct. In this way laminar flows that are typical of smooth ducts and reduce heat exchange efficiency are advantageously avoided. A smooth duct, indeed, determines, in the fluid flowing inside the duct, a temperature gradient between the fluid in contact with the wall transferring heat to the outside and the fluid at the center of the duct, which fluid remains warmer. The non-smooth wall, instead, causes a mixing effect in the fluid inside the duct, thus making the temperature more homogeneous and preventing formation of a gradient.

A further advantage of the duct with a non-smooth wall derives from the fact that, because of its physical configuration, it has greater robustness than the smooth duct because of its physical configuration. Therefore, thanks to the invention it is possible to make the heating duct with a wall having reduced thickness, therefore further improving the heat exchange between the inside and the outside of the duct.

Preferably, the duct wall is non-smooth both inside and outside the duct. However, still according to the invention, embodiments are provided in which the non-smooth wall is non-smooth only inside or only outside. It is apparent that in this way the above-described advantages of the invention will be only partially exploited. Advantageously, according to the invention, the duct wall is made with such a non-smooth configuration as to confer rigidity and high resistance to vibrations. The feeding unit according to the invention is indeed intended to be used in tanks mounted on vehicles notoriously subjected to strong and constant vibrations due to the vehicle movement.

According to a preferred embodiment of the invention, the heating duct has circular cross-section and comprises a plurality of ridges and valleys both inside and outside the duct.

The ridges and valleys define a corrugated, knurled, bossed, embossed, wavy or pleated surface of the at least one duct portion. According to the invention, the ridges and valleys are preferably annular and oriented either perpendicularly or obliquely to the flow of the fluid circulating in the duct; however, ridges and valleys oriented along different directions can also be provided. The annular ridges and valleys are preferably mutually perpendicular. This configuration ensures high rigidity and resistance of the duct to the vibrations induced on it by the movement of the vehicle to which the tank is associated. In addition, the shape with parallel rings for the ridges and valleys causes high turbulence in the fluid passing through the duct, which turbulence is higher than in the case of spiral-like shapes, with consequent increase in the duct temperature by virtue of this turbulence. Thus, thanks to this configuration, an increase in the quantity of heat transferred to the reducing substance is obtained for a same heat of the fluid circulating in the duct, and consequently a decrease in the thawing time of the reducing substance is attained. Still according to the invention, it is also possible to provide spiral-oriented ridges and corresponding valleys.

In accordance with a preferred embodiment of the invention, the inner cross-section of the duct at the ridges is about 5-10% greater than the inner cross-section of the duct at the valleys. However, higher percentages can be provided.

Still according to the invention, the heating duct is preferably made of steel.

BRIEF DESCRIPTION OF THE DRAWINGS

Some preferred embodiments and variants of the invention will be described below by way of non-limiting example with reference to the annexed drawings, in which.

DESCRIPTION OF SOME PREFERRED EMBODIMENTS OF THE INVENTION

In the drawings, same or functionally equivalent parts are designated with the same referenced numerals.

Figure 1A:
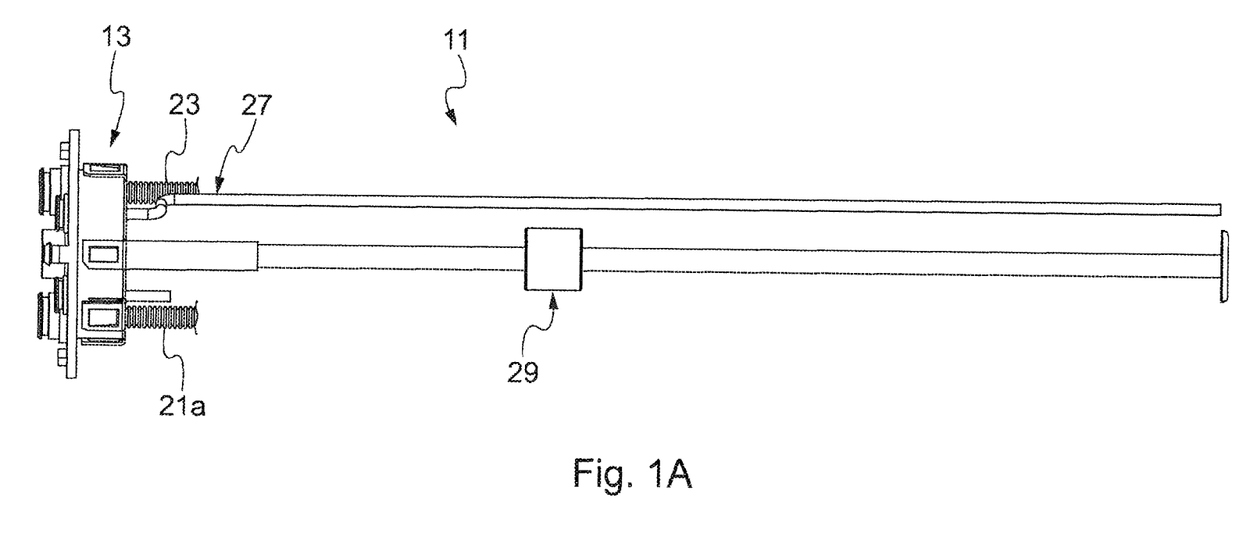
FIG. 1A is a perspective view of the feeding unit according to the invention, with the heating duct partially removed.
Figure 1B:
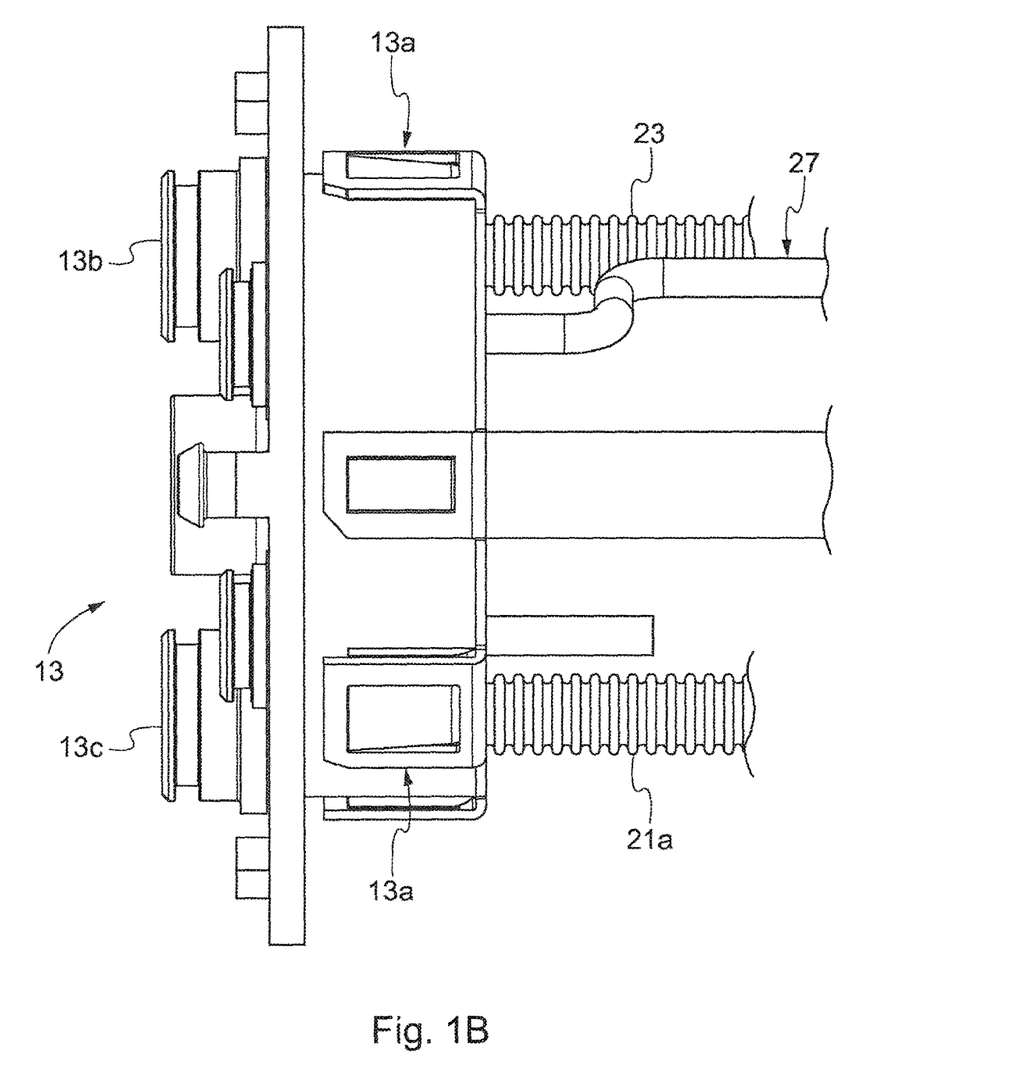
FIG. 1B is an enlarged view of a portion of the unit of FIG. 1A.
Figure 2A:
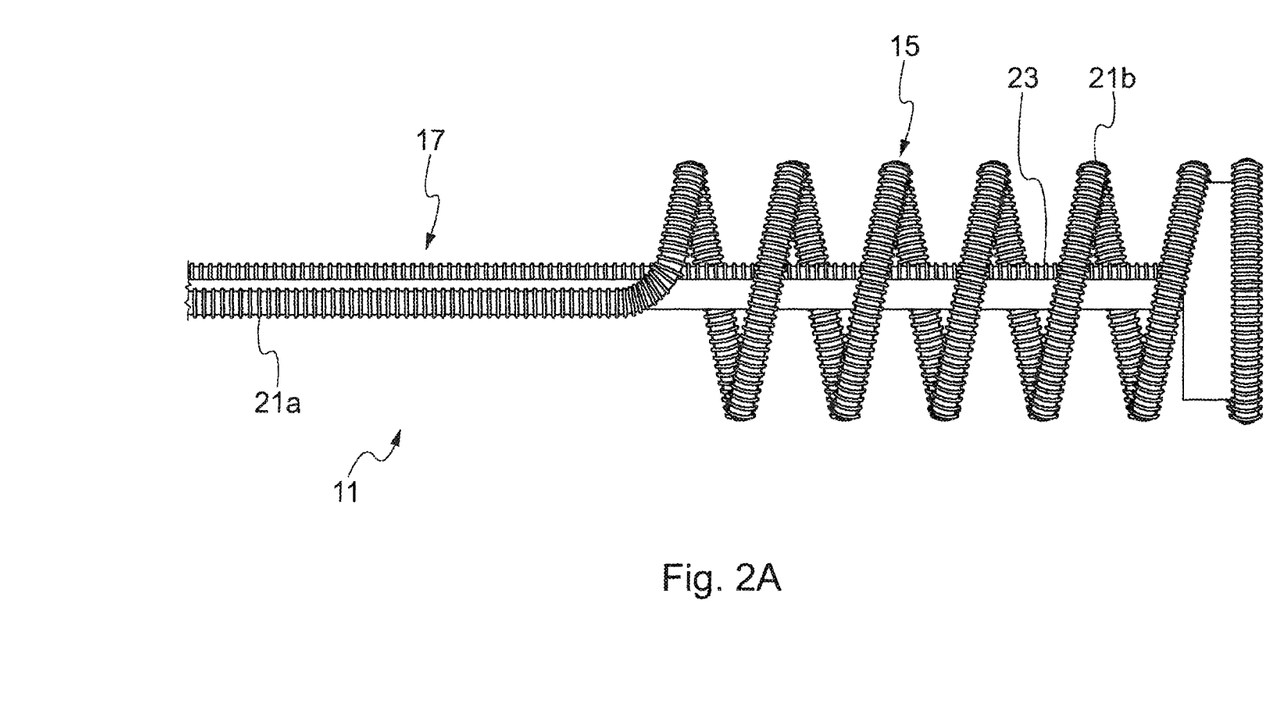
FIG. 2A is a perspective view of the heating duct.
Figure 2B:
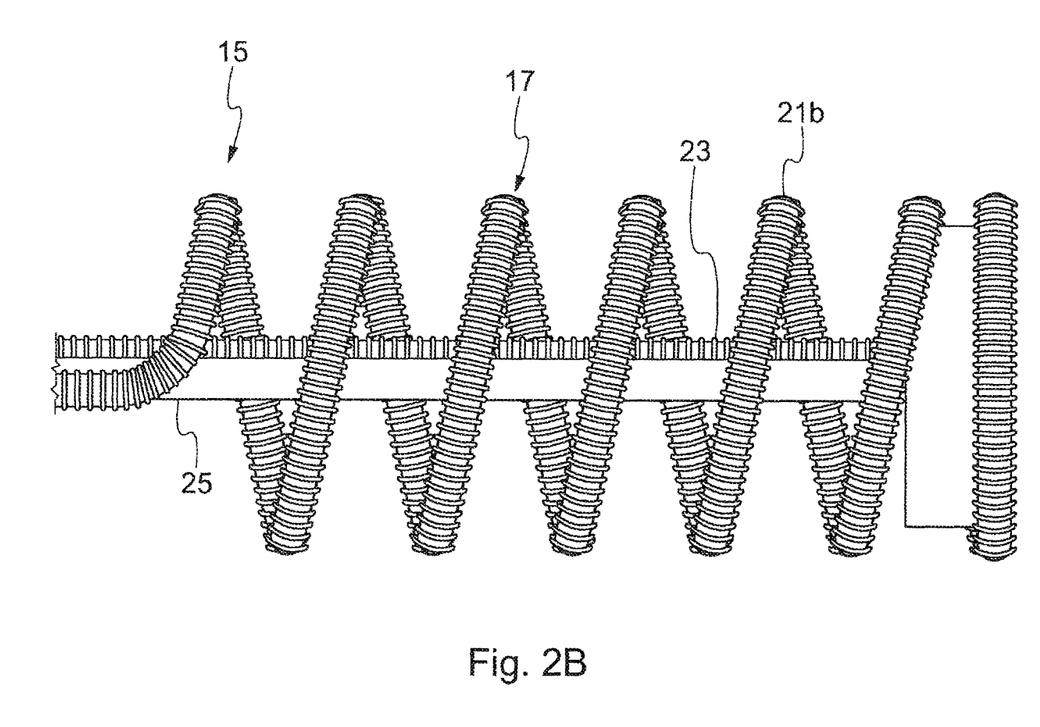
FIG. 2B is an enlarged view of a portion of the heating duct.

Referring to FIGS. 1A and 1B, there is illustrated a unit 11 for feeding a reducing solution from the tank to the exhaust of an I.C. engine, according to a preferred embodiment of the invention. The unit 11 comprises a supporting head 13. The head 13 is arranged for being firmly associated to an aperture provided in a reducing solution tank. In the example shown, the head 13 has a disk-like shape. The head 13 allows fixing of the unit 11 to the tank with conventional methods known to the person skilled in the art, such as by means of radial spring clips 13a. Referring also to FIGS. 2A and 2B, the unit further comprises a heating device 15 for heating the reducing solution contained in the tank. The device 15 extends longitudinally from the supporting head 13 and comprises a duct 17 for a heating fluid. When the unit 11 is mounted in the reducing solution tank, the duct 17 is inside the tank and is at least partially submerged in the reducing solution contained therein.

The duct 17 is firmly associated to the head 13 and is in hydraulic connection with the outside of the tank through openings 13b, 13c provided in the head 13 and equipped with connectors for connection to the cooling circuit of the I.C. engine. The duct 17 is isolated from the tank by means of the head 13, which can preferably be made of a plastic material. The duct 17 which is inside the duct forms a closed path and preferably has a forward section, in which a rectilinear portion 21a and a spiral-like portion 21b are provided, and a rectilinear return section 23. The unit 11 further comprises a tube 25 for taking the reducing solution out of the tank in which said solution is contained, a temperature sensor 27 and a level sensor 29.

Figure 3A:
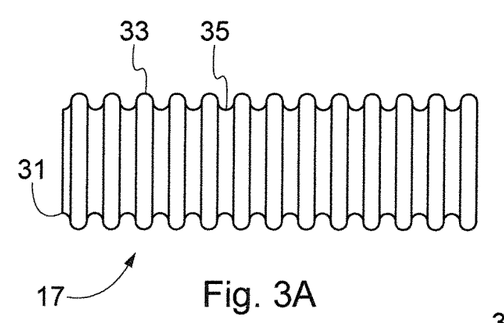
FIG. 3A is a side view of a portion of the heating duct of the unit of FIG. 1, in a first embodiment.
Figure 3B:
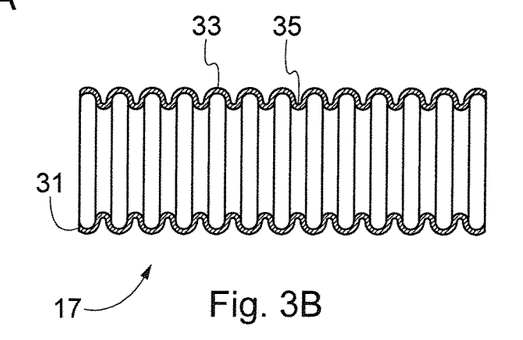
FIG. 3B is a longitudinal sectional view of the duct of FIG. 3A.

Referring to FIGS. 3A and 3B, the wall 31 of the duct 17 is non-smooth inside and outside the duct. When the unit 11 is in use, the wall 31 on its inside is in contact with the heating fluid circulating in the duct 17 and on its outside is in contact with the reducing solution contained in the tank.

In the illustrated embodiment the duct 17 has circular cross-section. In addition, still with reference to the illustrated embodiment, the wall 17 is corrugated and comprises a plurality of continuous annular ridges 33 and valleys 35 that are mutually alternated and regularly distributed both inside and outside the duct 17. The ridges 33 and the valleys 35, both being annular, are preferably parallel. Advantageously, with this arrangement, the motion of the heating fluid passing through the duct 17 is turbulent and promotes a better heat exchange with the wall 31 of the duct 17. In addition, the useful surface for the heat exchange between the heating fluid or the reducing solution and the wall 31 of the duct 17 is greater, for a same length, than in the case of an hypothetical duct with smooth wall.

In this embodiment the inner cross-section of the duct 17 at the ridges 33 is about 5-10% greater than the inner cross-section of the duct 17 at the valleys 35.

Figure 4:
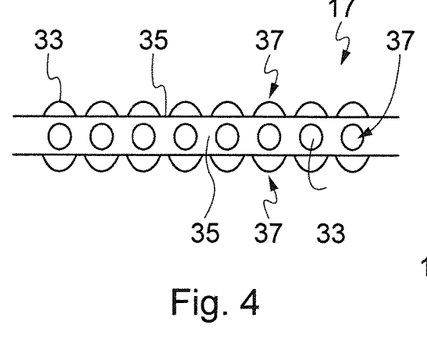
FIG. 4 is a longitudinal sectional view of the heating duct, in a second embodiment of the unit according to the invention.

Referring to FIG. 4, there is illustrated a first variant of the unit 11, in which the wall 31 of the duct 17 comprises a plurality of bosses 37 defining as many ridges 33 and valleys 35 both inside and outside the duct 17. In the example shown, the bosses 37 have a circular base and extend outside the duct 17 so as to form corresponding hemispheres. The bosses 37 are regularly distributed along the wall 31 of the duct 17 and define as a whole a bossed wall 31. In other embodiments the bosses 37 can be distributed in an irregular way.

Figure 5:
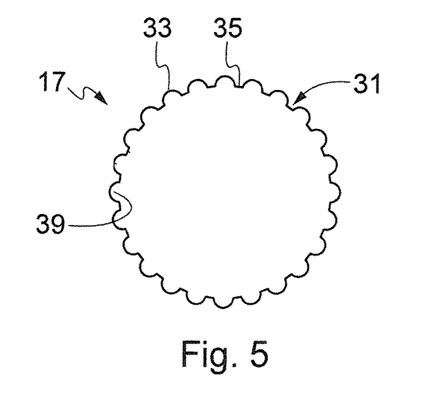
FIG. 5 is a cross-section of a portion of the heating duct of the unit of FIG. 1, in a third embodiment.

Referring to FIG. 5, there is illustrated a second variant of the unit 11, in which the wall 31 has a plurality of longitudinal projections 39. In the example shown, the projections 39 have a semi-circular cross-section and define as many ridges 33 and valleys 35 distributed around the duct. The projections 39 are regularly distributed around the duct 17, but irregular projections can be provided in other embodiments. It is apparent that according to this variant the advantage of the invention are partially exploited, as no turbulent motion is substantially generated inside the duct, because the ridges 33 and the valleys 35 are parallel, rather than perpendicular or oblique, to the flow.

Figure 6:
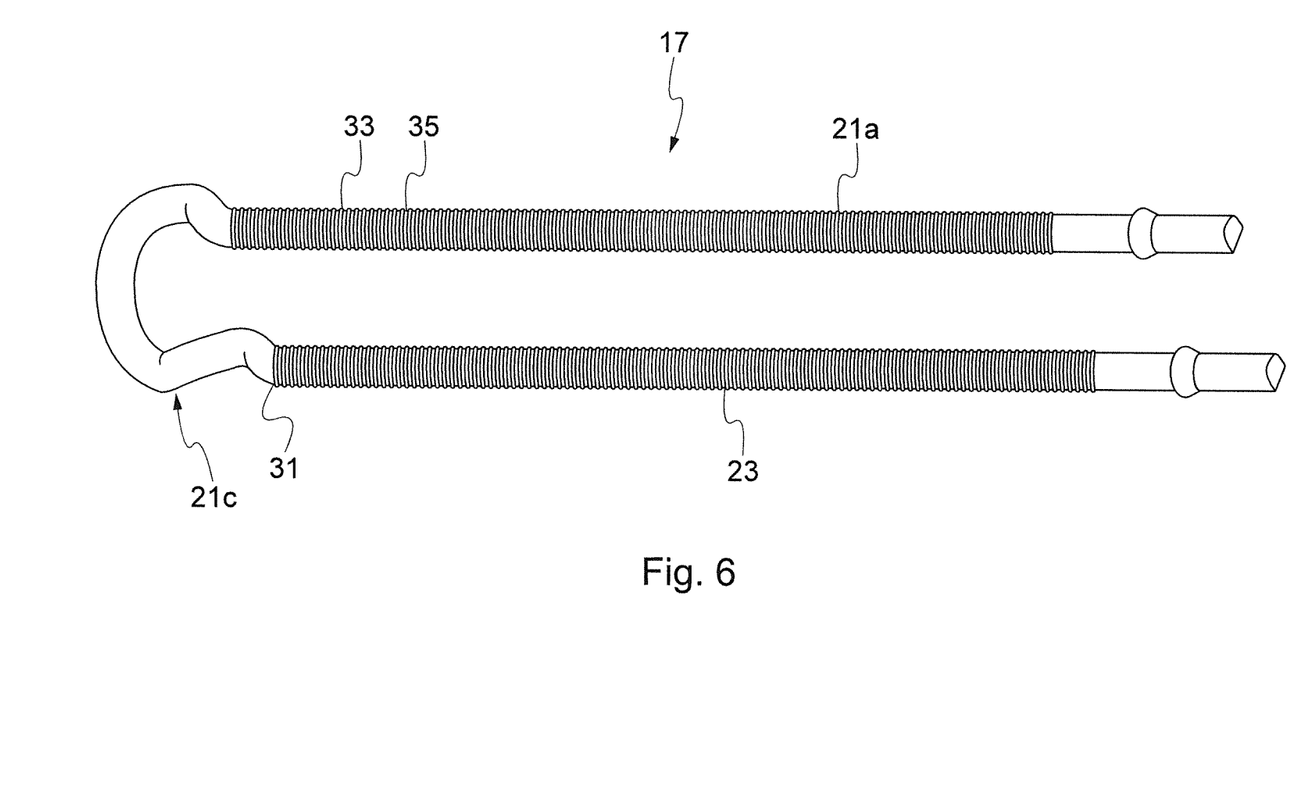
FIG. 6 is a perspective view of the heating duct in a variant.

Referring to FIG. 6, there is illustrated a variant of the heating duct 17. According to this variant, the duct 17 comprises a forward section, in which a rectilinear portion 21a and a horseshoe-shaped portion 21c are defined, and a rectilinear return section 23. The rectilinear portion 21a and the section 23 have axes that are mutually parallel and the wall 31 that is corrugated inside and outside. Ridges 33 and valleys 35 are therefore defined on said wall 31. The horseshoe-shaped portion 21c is, instead, preferably smooth for simplifying manufacturing. The horseshoe-shaped portion 21c further extends on a plane that is substantially perpendicular to the parallel axes of the portion 21a and of the section 23 of the duct 17.

The invention as described and illustrated may undergo several changes and modifications falling within the same inventive principle.

The invention claimed is:

1. A unit (11) for feeding a reducing solution tank of a vehicle equipped with an endothermic engine, said unit being for feeding a reducing solution from the tank to an exhaust duct of the endothermic engine, said unit comprising a supporting head (13) firmly associated to an aperture of the reducing solution tank and a heating device (15) for heating the reducing solution contained in the tank, the heating device (15) extending longitudinally from the supporting head (13) and being provided with a duct (17) for a heating fluid, said duct (17) being defined by a side wall (31) which, when the unit (11) is in use, is internally in contact with the heating fluid passing through the duct (17) and externally in contact with the reducing solution present in the tank, wherein said duct (17) has a circular cross-section and comprises a forward section in which a rectilinear portion (21a) and a horseshoe-shaped portion (21c) are defined, and a rectilinear return section (23), said rectilinear portion (21a) and return section (23) having axes that are mutually parallel and said horseshoe-shaped portion (21c) extending on a plane that is substantially perpendicular to the parallel axes of the rectilinear portion (21a) and of the return section (23) of the duct (17), wherein the side wall (31) of each of the rectilinear portion (21a) and return section (23) of the duct (17) is corrugated inside and outside and comprises a plurality of ridges (33) and valleys (35), wherein the ridges (33) and the valleys (35) are oriented perpendicularly to the flow of the heating fluid circulating in the duct (17), annularly continuous, mutually alternated and regularly distributed both inside and outside the duct, and the horseshoe-shaped portion (21c) of the duct (17) is smooth.

2. The unit according to claim 1, wherein the side wall (31) of each of the rectilinear portion (21a) and return section (23) of the duct (17) is corrugated, so as to cause a turbulent motion in the heating fluid flowing through the duct (17) and to increase the thermal exchange surface with respect to both the fluid flowing inside the duct and the reducing solution surrounding it.

3. The unit according to claim 2, wherein an inner cross-section of the duct (17) at the ridges (33) is about 5-10% greater than an inner cross-section of the duct (17) at the valleys (35).

4. The unit according to claim 3, wherein the head has a disk like shape and comprises means for fixing the unit (11) to the tank, wherein, when the unit (11) is mounted in the reducing solution tank, said duct (17) is in hydraulic connection with the outside of the tank through openings (13b,13c) provided in the head (13) and equipped with connectors for connection to a cooling circuit of the endothermic engine, said duct (17) being isolated from the tank by means of the head (13), wherein the duct (17) forms a closed path and wherein the unit (11) further comprises a tube (25) for taking the reducing solution out of the tank in which said solution is contained, a temperature sensor (27), and a level sensor (29).

5. The unit according to claim 4, wherein said means for fixing the unit (11) to the tank comprise radial spring clips (13a).

6. The unit according to claim 5, wherein said head (13) is made of plastic material.

7. The unit according to claim 4, wherein said head (13) is made of plastic material.

8. The unit according to claim 2, wherein the head has a disk like shape and comprises means for fixing the unit (11) to the tank, wherein, when the unit (11) is mounted in the reducing solution tank, said duct (17) is in hydraulic connection with the outside of the tank through openings (13b,13c) provided in the head (13) and equipped with connectors for connection to a cooling circuit of the endothermic engine, said duct (17) being isolated from the tank by means of the head (13), wherein the duct (17) forms a closed path and wherein the unit (11) further comprises a tube (25) for taking the reducing solution out of the tank in which said solution is contained, a temperature sensor (27), and a level sensor (29).

9. The unit according to claim 8, wherein said means for fixing the unit (11) to the tank comprise radial spring clips (13a).

10. The unit according to claim 9, wherein said head (13) is made of plastic material.

11. The unit according to claim 8, wherein said head (13) is made of plastic material.

12. The unit according to claim 1, wherein an inner cross-section of the duct (17) at the ridges (33) is about 5-10% greater than an inner cross-section of the duct (17) at the valleys (35).

13. The unit according to claim 1, wherein the head has a disk like shape and comprises means for fixing the unit (11) to the tank, wherein, when the unit (11) is mounted in the reducing solution tank, said duct (17) is in hydraulic connection with the outside of the tank through openings (13*b*,13*c*) provided in the head (13) and equipped with connectors for connection to a cooling circuit of the endothermic engine, said duct (17) being isolated from the tank by means of the head (13), wherein the duct (17) forms a closed path and wherein the unit (11) further comprises a tube (25) for taking the reducing solution out of the tank in which said solution is contained, a temperature sensor (27), and a level sensor (29).

14. The unit according to claim 13, wherein said means for fixing the unit (11) to the tank comprise radial spring clips (13*a*).

15. The unit according to claim 14, wherein said head (13) is made of plastic material.

16. The unit according to claim 13, wherein said head (13) is made of plastic material.

17. A vehicle comprising an endothermic engine having an exhaust duct, a reducing agent tank, and the unit (11) according to claim 1 for feeding a reducing agent solution from the tank to the exhaust duct of the endothermic engine.

* * * * *